UNITED STATES PATENT OFFICE.

JOHN M. YOUNG, OF LAWRENCE, NEBRASKA.

COMPOUND FOR TREATING SEEDS.

SPECIFICATION forming part of Letters Patent No. 424,843, dated April 1, 1890.

Application filed February 6, 1890. Serial No. 339,477. (No specimens.)

*To all whom it may concern:*

Be it known that I, JOHN M. YOUNG, a citizen of the United States of America, residing at Lawrence, in the county of Nuckolls and State of Nebraska, have invented certain new and useful Improvements in Compounds for Treating Seeds; and I do hereby declare the following to be a full, clear, and exact description of the invention, such as will enable others skilled in the art to which it appertains to make and use the same.

My invention relates to an improved compound for treating seeds prior to planting, the purpose thereof being to destroy parasitical fungus or smut and any germs of disease that render it distasteful; and it consists in a compound composed of blue vitriol, copperas, and unslaked lime, which are reduced to a solution by the addition of water and applied to the seeds prior to planting.

In carrying out my invention I prefer to use about four parts of blue vitriol or sulphate of copperas, one part of copperas or the commercial sulphate of iron, sometimes known as "green vitriol," and one part of unslaked lime. These ingredients are dissolved in sufficient water, and immediately thereafter the grain is dipped into this solution until it is thoroughly wet, after which it may be dried and is ready for planting.

Heretofore it has been the practice to treat wheat and analogous grains with blue-stone or sulphate of copper preparatory to sowing; but I have found in practice that the addition of lime renders the action of the blue vitriol and copper much more rapid, as when the water is applied the lime will generate a certain amount of heat, which renders the action of the aforesaid ingredients more positive. The lime and ingredients which remain upon the grains serve as a fertilizer.

Having thus described my invention, I claim—

1. A compound for treating seed prior to planting, consisting of sulphate of copper, commercial sulphate of iron, and lime, the same being adapted for use by the addition of water, substantially as set forth.

2. A compound for treating seed prior to planting, consisting of four parts of sulphate of copper, one part of commercial sulphate of iron, and one part of unslaked lime reduced to a solution by the addition of water, for the purpose set forth.

In testimony whereof I affix my signature in presence of two witnesses.

JOHN M. YOUNG.

Witnesses:
MAT. FRIEND,
T. H. CHRISTY.